Figure 4:
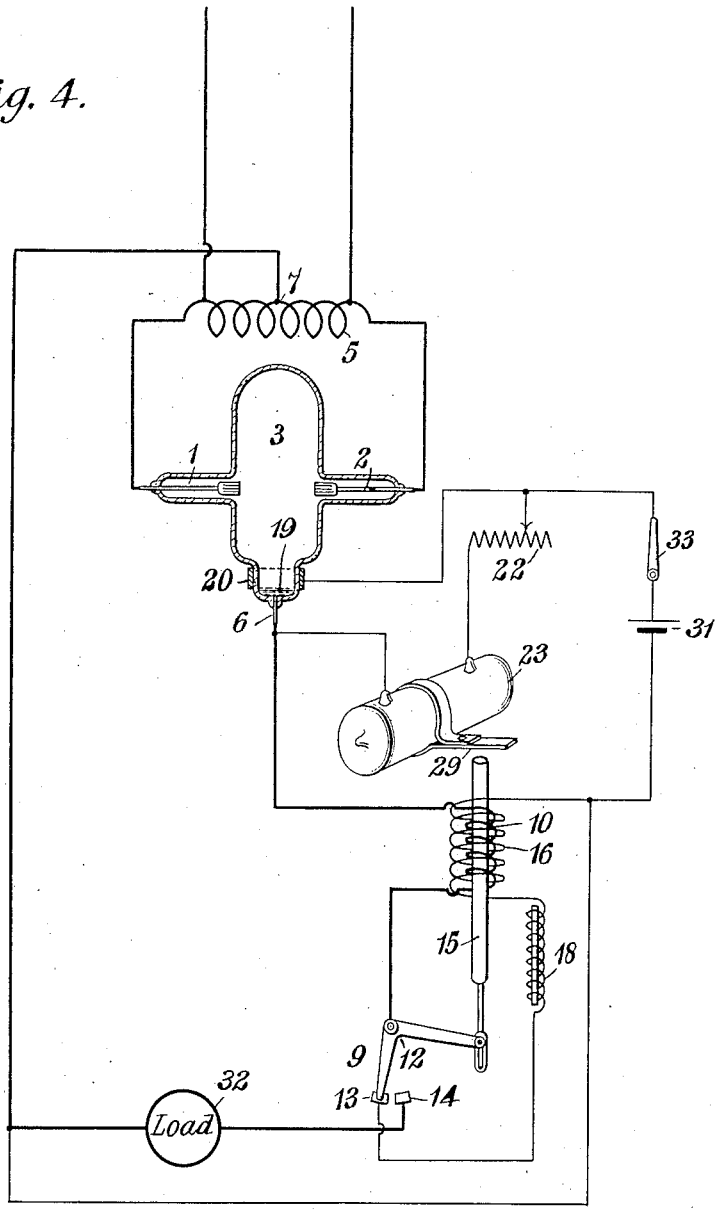

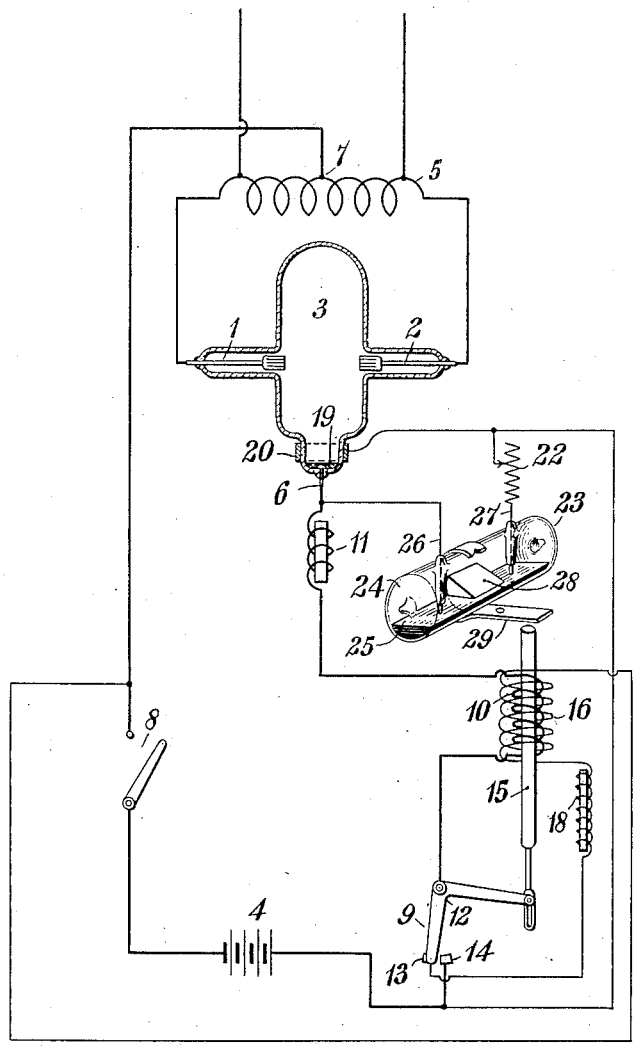

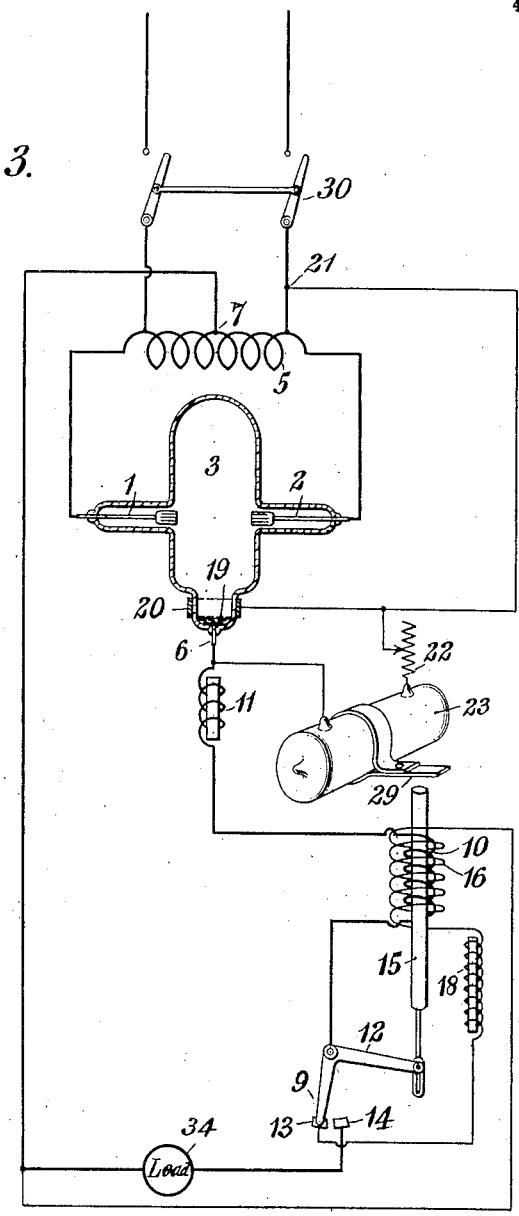

F. S. CHAPMAN.
AUTOMATIC STARTING DEVICE FOR MERCURY VAPOR RECTIFIERS.
APPLICATION FILED OCT. 5, 1907.

969,523.

Patented Sept. 6, 1910.

4 SHEETS—SHEET 3.

WITNESSES:
C. L. Belcher
Otto S. Schairer

INVENTOR
Frederick S. Chapman
BY
Wesley G. Carr
ATTORNEY

F. S. CHAPMAN.
AUTOMATIC STARTING DEVICE FOR MERCURY VAPOR RECTIFIERS.
APPLICATION FILED OCT. 5, 1907.

969,523.

Patented Sept. 6, 1910.
4 SHEETS—SHEET 4.

UNITED STATES PATENT OFFICE.

FREDERICK S. CHAPMAN, OF PITTSBURG, PENNSYLVANIA, ASSIGNOR TO WESTING-
HOUSE ELECTRIC & MANUFACTURING COMPANY, A CORPORATION OF PENNSYL-
VANIA.

AUTOMATIC STARTING DEVICE FOR MERCURY-VAPOR RECTIFIERS.

969,523.  Specification of Letters Patent.  Patented Sept. 6, 1910.

Application filed October 5, 1907. Serial No. 396,041.

*To all whom it may concern:*

Be it known that I, FREDERICK S. CHAPMAN, a citizen of the United States, and a resident of Pittsburg, in the county of Allegheny and State of Pennsylvania, have invented a new and useful Improvement in Automatic Starting Devices for Mercury-Vapor Rectifiers, of which the following is a specification.

My invention relates to mercury-vapor rectifiers, and it has for its object to provide effective and reliable means for automatically starting the rectifying operation by closing a single switch either in the direct or alternating current circuit.

Figure 1 of the accompanying drawings is a diagrammatic view of a system of distribution that embodies my invention, and Fig. 2 is an enlarged sectional view of one of the devices shown in Fig. 1, and Figs. 3, 4 and 5 are diagrammatic views of systems embodying modifications of the invention.

In Fig. 1, the positive or alternating current terminals 1 and 2 of a mercury-vapor rectifying device 3, that may be utilized to charge a storage battery 4, are connected to the terminals of an auto-transformer 5 from which the rectifying device is supplied. The direct current circuit of the device is connected, in the usual manner, between negative or direct current terminal 6 thereof and the neutral or an intermediate point 7 of the auto-transformer 5, the said circuit comprising a manually-operated circuit-closing switch 8, the battery 4, a switch 9, the magnetizing winding 10 of an actuating device for the switch 9, and a sustaining coil or reactance device 11. If the transformer 5 is designed so that there is considerable leakage in its magnetic circuit, the device 11 may be omitted from the direct current circuit.

The switch 9 comprises a bell-crank lever 12, one end of which engages, and is adapted to move over, stationary contact terminals 13 and 14, and the other end of which has a slot-and-pin connection with a magnetizable core 15 for the winding 10. The core 15 is also surrounded by a magnetizing winding 16 that is connected between stationary contact terminal 13 of the switch 9 and the neutral or intermediate point 7 of the auto-transformer 5, an inductive winding 18 being included in series therewith.

Upon the exterior of the rectifying device and adjacent to the pool of mercury 19 that surrounds the negative terminal of the device, is a conducting band 20 that serves as one plate of a condenser, of which the inner surface of the glass serves as the other plate, the said band being connected to the positive terminal of the battery 4.

Connected in shunt to the conducting band 20 and negative terminal 6 of the rectifying device is a resistance 22 and a switch device 23 that comprises a rotatable tubular receptacle 24 containing mercury 25, into which project terminals 26 and 27 of the device, the receptacle 24 being divided by means of a partition 28 into two basins, and the mercury being of such a depth that the two pools are electrically connected by a small neck of mercury over the top of the partition, when the receptacle occupies its normal position, as indicated in the drawing. When the receptacle 24 is rotated, however, the two pools of mercury are entirely separated and disconnected by the partition 28.

The receptacle 24 is clamped in a band 29 one end of which projects over the upper end of the magnet core 15 in such a manner that, when the said core is raised a slight amount, the band and the receptacle will be rotated thereby. The arrangement is also such that the receptacle 24 will be rotated to break the electrical connection between the pools of mercury therein before the bell-crank lever 12 is moved out of engagement with contact terminal 13 and into engagement with contact terminal 14, the slot-and-pin connection between the bell-crank lever and the magnet core 15 permitting of such adjustment.

In order to start the rectifying operation, the switch 8 must first be closed, a circuit being thereby established from the battery 4 by way of devices 22, 23, 11, 10, 12, 13, 18, 16 and 8 to the negative terminal of the battery 4. The magnet windings 10 and 16, being thus energized, raise the magnet core 15 to cause rotation of the switch device 23 in such a manner as to quickly interrupt the electrical connection between the pools of mercury in the receptacle 24. The energy stored in the inductive windings 11 and 18 is thereupon discharged through the circuit comprising the conducting band 20 and the negative terminal of the rectifying device, the said discharge causing sparks within the rectifying device which overcome the initial high resistance thereof. The rectifying operation will thereupon begin, and direct current will momentarily traverse a circuit from the negative terminal 6 of the rectifier, through devices 11, 10, 12, 13, 18 and 16 to the neutral or intermediate point 7 of the auto-transformer 5. The increased amount of current which now traverses the magnet windings 10 and 16 causes the magnet core 15 to be so raised as to move the bell-crank lever 12 of the switch 9 out of engagement with the terminal 13 and into engagement with the terminal 14, contact being made with the latter terminal before it is broken with the former. A circuit is thereupon established from the negative terminal of the rectifying device, through the sustaining coil 11, magnet winding 10, bell-crank lever 12, terminal 14, battery 4 and the switch 8 to the neutral or intermediate point 7 of the auto-transformer winding 5, the current traversing the coil 10 being sufficient to maintain the magnet core 15 in its raised position and the bell-crank lever 13 in engagement with the terminal 14. The rectifying operation will then continue so long as the switch 8 remains closed, and the battery 4 will be charged.

In Fig. 1, the current for causing sparks within the rectifying device is derived from the battery 4 that is to be charged, but, if desired, it may be derived directly from the source of alternating current to which the rectifying device is connected, as illustrated in Fig. 3, in which the connecting band 20 and the resistance 22 are connected directly to some point, such as a terminal 21, of the auto-transformer winding 5. When this is done, the rectifier may supply current to any other suitable load than a storage battery, as indicated at 34. In this arrangement, also, the switch 8 is omitted from the direct current circuit and the operation of the device is governed entirely by means of a switch 30 located in the alternating current circuit. Upon closing the switch 30, a circuit is first established from the terminal 21 of the auto-transformer winding 5, by way of devices 22, 23, 11, 10, 13, 18 and 16 to the intermediate or neutral point 7 of the auto-transformer winding 5. Magnet core 15 is then raised, as before, causing an interruption of the said circuit in the device 23, and a spark discharge within the rectifying device. The rectifying process then begins, the direct current traversing a circuit comprising devices 6, 11, 10, 13, 18 and 16. The bell crank lever 12 is then moved into engagement with contact terminal 14, and the load 34 becomes connected in the direct current circuit of the rectifier, as before.

An auxiliary source of current for causing spark discharges within the rectifier may also be employed, if desired, as illustrated in Fig. 4, in which a small primary or secondary battery 31 is connected to the conducting band 20 and the resistance 22, and to one terminal of the magnet winding 16, the rectifier being connected to any suitable load 32. A small switch 33 is employed in the system to govern the circuit of the battery 31. When the switch 33 is closed, a circuit is established by way of devices 33, 22, 23, 10, 13, 18 and 16 to the other terminal of the battery. The magnet core 15 is then raised sufficiently to cause interruption of the said circuit within the device 23 and a consequent spark discharge within the rectifying device. The rectifying process then begins, the direct current being supplied to an auxiliary circuit extending between the negative terminal 6 of the rectifier and the intermediate point 7 of the auto-transformer winding 5 and including devices 10, 13, 18 and 16. The increased amount of current which then traverses the magnet windings 10 and 16 causes movement of the bell crank lever 12 into engagement with contact terminal 14, thereby establishing a circuit from the negative terminal 6 of the rectifier through devices 10, 14 and 32, to the intermediate point 7 of the auto-transformer winding 5.

Figure 5:
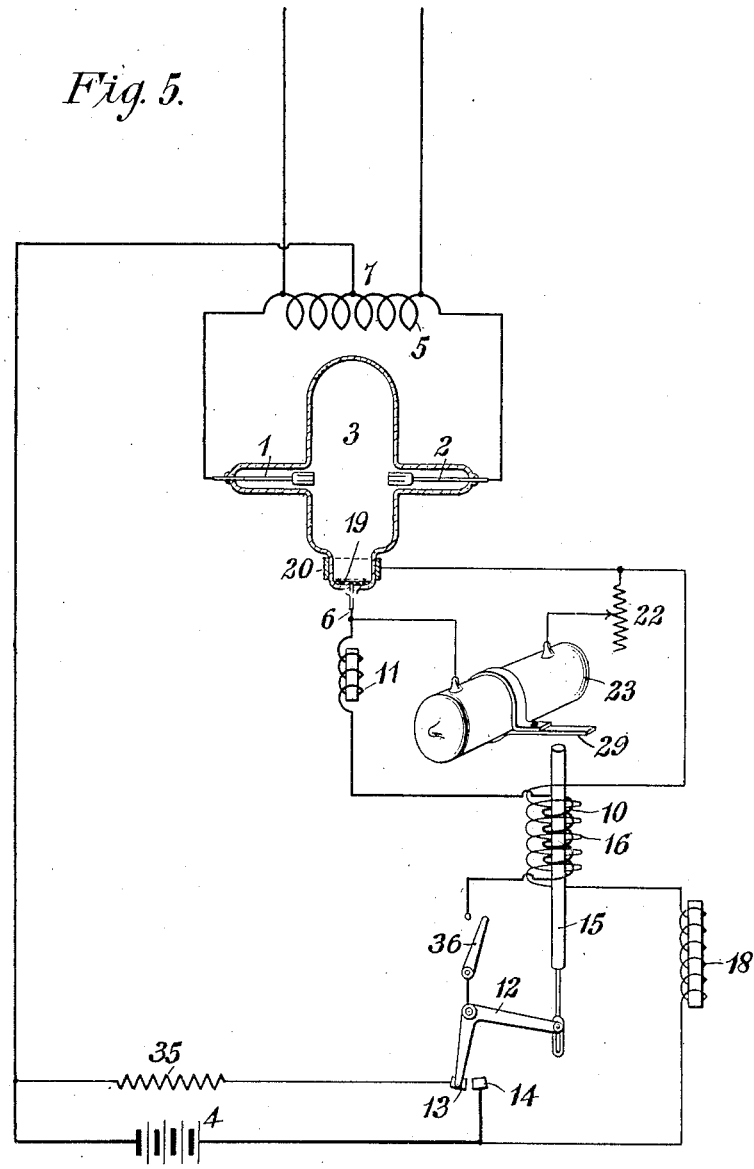

The function of the inductive device 18, in all cases, is to introduce sufficient inductance into the starting circuit to cause sparks within the rectifying device when the circuit is interrupted in the switch device 23, and in Figs. 1, 3 and 4 it is also included in the auxiliary direct current circuit, and is, in those cases, preferably provided with such ohmic resistance that additional ohmic resistance need not be included in the said circuit, though, if desired, an auxiliary ohmic resistance device may be employed. In Fig. 5 the inductive device 18 is included only in the starting circuit for the purpose of causing an inductive discharge and sparking within the rectifying device and is not included in the auxiliary direct current circuit, and, for that reason, an ohmic resistance 35 is included in the auxiliary direct current circuit. The magnet winding 16 is also included only in the starting circuit and, therefore, serves only to assist in raising the core 15 a sufficient amount to cause interruption of the starting circuit within the switch device 23.

A manually operated switch 36 is employed to control the operation of the device, and when it is closed a starting circuit is established, including devices 4, 35, 13, 12, 36, 10, 11, 23, 22, 16 and 18. The magnet windings 10 and 16 are then energized and cause the core 15 to be raised sufficiently to rotate the device 23 and effect interruption of the starting circuit therein. Sparking then occurs within the rectifier and overcomes the initial high resistance thereof, whereupon direct current is supplied to a circuit comprising devices 11, 10, 36, 12, 13 and 35. Energizing of the winding 10 with an increased amount of current causes the core 15 to be raised still further, which, in turn, effects movement of the bell crank lever 12 out of engagement with the terminal 13 and into engagement with the terminal 14. The direct current circuit then includes devices 11, 10, 36, 12, 14 and 4.

The devices shown are only illustrative of suitable means whereby the invention may be carried into effect, and it will, therefore, be readily understood that other means that differ considerably therefrom in structure and arrangement of parts may be employed, if desired, and the arrangement of the circuits may also be considerably modified, without departing from the spirit of the invention or altering its mode of operation, and I desire that all such modifications be included within its scope.

I claim as my invention:

1. The combination with a mercury-vapor rectifier, and a load therefor, of a switch for governing the operation of the rectifier, means for overcoming the initial high resistance of the rectifier, a switch for governing the resistance-overcoming means, an automatically actuated device for operating the said switch, and a switch normally connecting the rectifier to an auxiliary direct current circuit but actuated by said device, upon passage of current in the auxiliary circuit, to connect the rectifier to the load.

2. The combination with a mercury-vapor rectifier, means for overcoming the initial high resistance thereof, and a governing switch for said means, of a switch for altering the direct current circuit of the rectifier, and a device actuated by the current in the said direct current circuit for operating the said switches successively when starting the rectifying operation.

3. The combination with a mercury-vapor rectifier, means for overcoming the initial high resistance thereof, and a governing switch for said means, of a switch for connecting either an auxiliary direct current circuit or a load to the rectifier, and a device for operating the said switches comprising two windings both of which are energized when the auxiliary circuit is connected to the rectifier and only one of which is energized when the load is connected to the rectifier to maintain the said connection.

In testimony whereof, I have hereunto subscribed my name this 27th day of September, 1907.

FREDERICK S. CHAPMAN.

Witnesses:
R. B. INGRAM,
BIRNEY HINES.